United States Patent
Mures et al.

(10) Patent No.: US 7,660,508 B2
(45) Date of Patent: Feb. 9, 2010

(54) TERMINAL SHIELDS FOR PROTECTING OPTICAL COMPONENTS IN OPTICAL ASSEMBLIES

(75) Inventors: Marcel G. Mures, Fort Worth, TX (US); Omar J. Trevino, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/082,330

(22) Filed: Apr. 10, 2008

(65) Prior Publication Data

US 2009/0257728 A1    Oct. 15, 2009

(51) Int. Cl.
*G02B 6/44* (2006.01)
(52) U.S. Cl. ...................................... 385/135
(58) Field of Classification Search ............... 385/76, 385/92, 135, 139
See application file for complete search history.

(56) References Cited

U.S. PATENT DOCUMENTS

| | | | |
|---|---|---|---|
| 5,495,549 A * | 2/1996 | Schneider et al. | 385/135 |
| 5,525,756 A | 6/1996 | Mullaney et al. | 174/92 |
| 5,754,724 A | 5/1998 | Peterson et al. | 385/135 |
| 6,037,544 A | 3/2000 | Lee et al. | 174/92 |
| 6,218,620 B1 | 4/2001 | Michel | 174/92 |
| 6,359,228 B1 | 3/2002 | Strause et al. | 174/91 |
| 6,744,962 B2 | 6/2004 | Allerellie | 385/135 |
| 6,766,094 B2 | 7/2004 | Smith et al. | 385/135 |
| 6,778,752 B2 | 8/2004 | Laporte et al. | 385/135 |
| 7,239,789 B2 | 7/2007 | Grubish et al. | 385/135 |

FOREIGN PATENT DOCUMENTS

WO    WO 95/23449    8/1995

OTHER PUBLICATIONS

Corning Cable Systems, Product Specification Sheet—"UCAO Splice Closure," Dec. 2002, 2 pages.
Corning Cable Systems, Product Specification Sheet—"Taut-Sheath Closure SCA-9T34," Apr. 2002, 4 pages.

* cited by examiner

*Primary Examiner*—Jerry T Rahll
(74) *Attorney, Agent, or Firm*—John H. Vynalck

(57) ABSTRACT

Terminal shields are provided that are configured to protect an optical terminal device. The terminal shield comprises a first portion configured to be secured with respect to the optical terminal device. The terminal shield further comprises a second portion pivotally attached to the first portion. The second portion is configured to be pivoted relative to the first portion between an open orientation to provide access to an area of the optical terminal device and a closed orientation with the terminal shield disposed about a portion of the optical terminal device.

29 Claims, 5 Drawing Sheets

TERMINAL SHIELDS FOR PROTECTING OPTICAL COMPONENTS IN OPTICAL ASSEMBLIES

BACKGROUND OF THE INVENTION

1. Field of the Invention

The present invention relates generally to terminal shields, and more particularly, to a terminal shields and optical assemblies including a terminal shield.

2. Technical Background

Conventional optical terminal devices are known to house optical components including interconnections between optical fibers. Such conventional devices are frequently suspended from a support cable and are effective to protect the housed optical components from debris and outside weather conditions. However, conventional devices may fail to include structure sufficient to prevent damage caused by animals such as birds and rodents. Without such protection, animals may damage the outer housing and/or sensitive optical components within the optical terminal device.

SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In one example aspect, an optical assembly for interconnections between optical fibers is provided. The optical assembly includes an optical terminal device, a terminal bracket for connecting to the optical terminal device, and a terminal shield. The terminal shield includes a first portion hingedly attached to a second portion. The first portion is configured to be removably attached with respect to the optical terminal device. The second portion of the terminal shield is configured to be pivoted relative to the first portion between an open orientation providing access to an area of the optical terminal device and a closed orientation with the terminal shield disposed about a portion of the optical terminal device.

In another example aspect, a terminal shield is provided that is configured to protect an optical terminal device that provides for interconnections between optical fibers. The terminal shield includes a first portion, a second portion, and a retaining device. The first portion and the second portion each include a first edge that are hingedly connected together. Moreover, the first and second portions each include a second edge opposite the respective first edge. The second edge of the first portion includes a hook and the first portion further includes an aperture configured to receive a stop member of the optical terminal device. The retaining device is configured to selectively retain the second edges of the first portion and the second portion with respect to one another in a closed orientation.

In yet another example aspect, a terminal shield is provided that is configured to protect an optical terminal device that provides for interconnections between optical fibers. The terminal shield comprises a first portion including an interlocking structure configured to secure the first portion with respect to the optical terminal device. The terminal shield further comprises a second portion pivotally attached to the first portion, wherein the second portion includes a retaining device configured to selectively retain the terminal shield in a closed orientation.

In a further example aspect, a terminal shield is provided to protect an optical terminal device for interconnections between optical fibers. The terminal shield comprises a first portion configured to be secured with respect to the optical terminal device and a second portion pivotally attached to the first portion. The second portion is configured to be pivoted relative to the first portion between an open orientation to provide access to an area of the optical terminal device and a closed orientation with the terminal shield disposed about a portion of the optical terminal device.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
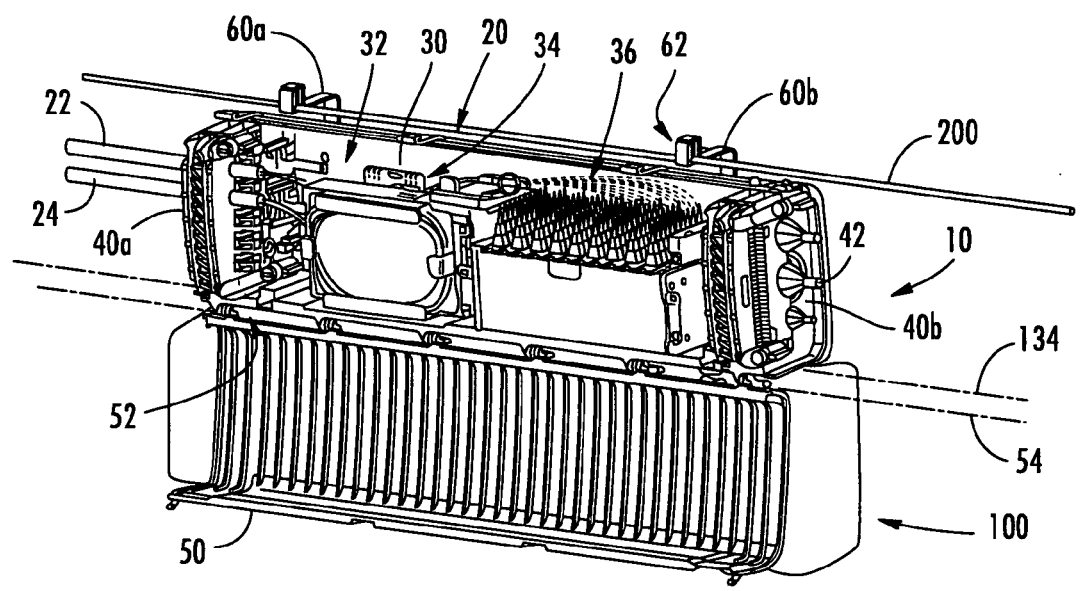
FIG. 1 is front perspective view of an example optical assembly that includes an example terminal shield in an open orientation and an example optical terminal device in an open orientation.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

As shown in FIG. 1, an example optical assembly 10 can include an optical terminal device 20 and a terminal shield 100. A wide range of optical terminal devices can be used in accordance with aspects of the present invention. Example optical terminal devices can accommodate interconnections between optical fibers and/or house other optical components. FIG. 1 illustrates one example optical terminal device 20 that may be similar or identical to the optical terminal device disclosed in U.S. Pat. No. 6,766,094 that is herein incorporated by reference in its entirety. As shown in FIG. 1, the optical terminal device 20 can permit interconnection between an optical fiber of a feeder cable 22 and two or more optical fibers of at least one distribution cable 24. The optical terminal device 20 can be provided at a location in the optical network that provides a field technician with access to the optical connections between the feeder cable 22 and the distribution cable 24. In one example, a typical optical network is constructed with a series of optical terminal devices along the network to provide informational services to homes and businesses, or to connect with optical fibers of branch cables leading to other optical terminal devices along the network.

Optical terminal devices, for example, can be installed above ground or at the ground surface, or may be buried below the ground. The optical terminal device 20 may further include a support structure, such as a bracket, configured to facilitate mounting of the optical terminal device in the desired location. In one example, the optical terminal device 20 can be disposed in a relatively large enclosure, such as an above ground pedestal. In further examples, the optical terminal device 20 may be installed at an aerial location. For instance, as shown, the optical terminal device 20 includes a first terminal bracket 60a and a second terminal bracket 60b configured to mount the optical terminal device 20 to a support structure 200. As shown, the support structure 200 can comprise an aerial support cable configured to extend between two telephone poles, support strands or the like. As further illustrated, the terminal brackets 60a, 60b can comprise hanging brackets that each include a cable clamp 62 configured to hang the optical terminal device 20 from the aerial support cable. In further examples, the support structure can allow mounting of the optical terminal device 20 directly to a telephone pole or may comprise a support structure configured to orient the optical terminal device in a below-ground structure, a pedestal, or other mounting environment.

Optical assemblies 10 of the present invention can include optical terminal devices having a wide variety of shapes and sizes depending on the particular application. As shown in FIG. 1, in one example, the optical terminal device 20 can comprise a base 30 defining an interior area 32 that may be partitioned into a first area for mounting fiber storage/management components 34 and a second area for mounting fiber coupling components 36 to the base 30. End caps 40a, 40b may be attached to the base 30 to provide closure to the end portions of the optical terminal device 20. Furthermore, the end caps 40a, 40b can be configured to permit the feeder cable 22 and the distribution cable 24 to be unsheathed and adequately strain relieved to the respective end cap 40a, 40b or the base 30. For instance, one or both of the end caps 40a, 40b can include one or a plurality of cable ports 42 that are configured to receive fiber optic cables. As shown, each end cap 40a, 40b can include three vertically arranged cable ports 42 although further examples can include a single or a plurality of cable ports arranged in various alternative patterns. The cable ports 42 can be designed to provide a fluid tight seal with the cable extending through the cable port to inhibit fluid leakage into the interior area 32 of the optical terminal device 20.

The optical terminal device 20 can further include a cover 50 pivotally attached to the base 30 by way of a hinge structure 52. The hinge structure 52 permits the cover 50 to pivot relative to the base 30 about a pivot axis 54 between an open orientation and a closed orientation. The hinge structure 52 can comprise the hinge arrangement shown in FIG. 1, a piano hinge arrangement, a living hinge arrangement or other structure configured to permit the cover to pivot relative to the base 30. The cover 50 can be retained in a closed orientation to provide a fluid tight seal between the cover 50, the base 30 and the end caps 40a, 40b. Moving the cover 50 to the closed orientation can therefore substantially seal the interior area 32 from fluid contamination and can further protect the interior area 32 from debris and/or other environmental contaminants. For instance, the cover 50 can be sealed against the base 30 and end caps 40a, 40b to protect the interior area and components within the interior area from debris, rain, snow or other environmental conditions existing outside of the optical terminal device 20. Moreover, a field technician may pivot the cover 50 about pivot axis 54 to the open orientation illustrated in FIG. 1. Once the cover 50 is pivoted to the open orientation, the field technician may properly service components and/or connections located within the interior area 32.

Figure 6:
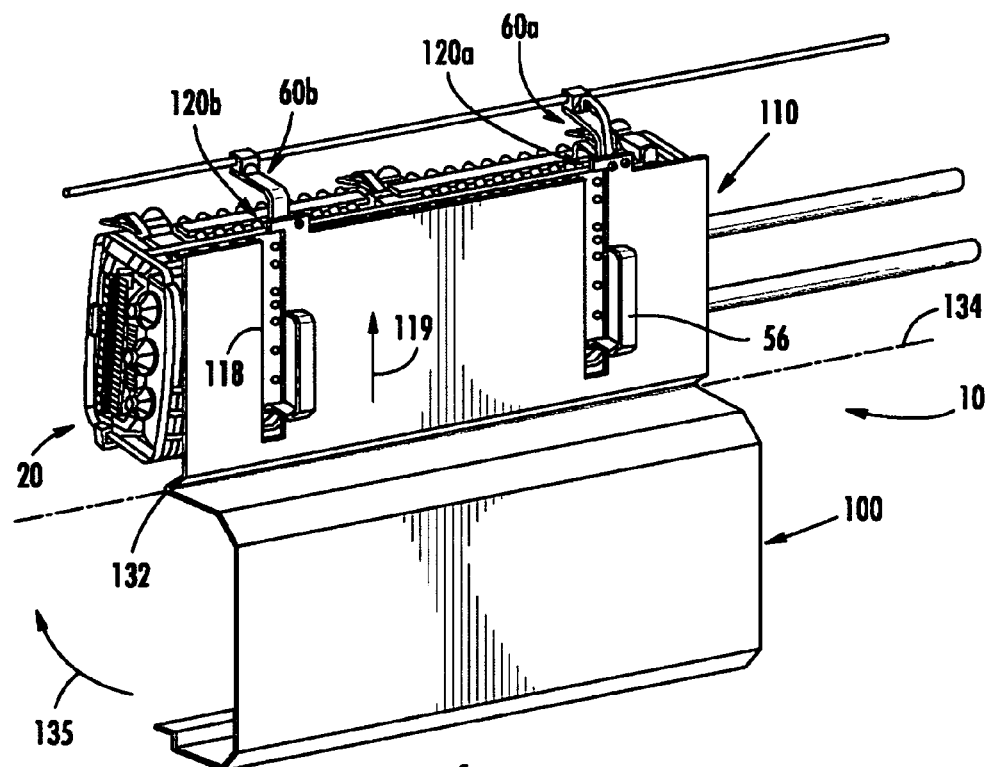
FIG. 6 is a rear perspective view of the optical assembly of FIG. 5 with a first portion of the terminal shield being interlocked with the optical terminal device.

As shown in FIG. 6, the optical terminal device 20 can also include a stop member 56. In one example, the stop member 56 can comprise a cable support configured to support a length of cable. For instance, the illustrated stop member 56 comprises a hook member or other structural configurations capable of supporting a length of cable.

As further illustrated, the optical assembly 10 includes an example terminal shield 100. The terminal shield 100 is configured to be disposed about a portion of the optical terminal device 20 to fortify and protect the optical terminal device 20. For example, the terminal shield 100 may be disposed about portions of the base 30, end caps 40a, 40b and/or the cover 50 to fortify and protect those portions of the optical terminal device 20. In the illustrated example, the terminal shield 100 is disposed about the cover 50 and the base 30. In further examples, the terminal shield 100 may also be disposed over at least a portion of one or both of the end caps 40a, 40b. The terminal shield 100 can be effective to protect the optical terminal device from debris or adverse weather conditions. In further examples, the terminal shield 100 can protect the optical terminal device 20 from damage that may be caused by animals such as birds and rodents. For instance, the terminal shield 100 can comprise metal or other impermeable material configured to discourage scratching, burrowing and/or gnawing by animals. In further examples, the terminal shield may include an animal repellant and/or may comprise material that is offensive to damaging animal behaviors.

Figure 2:
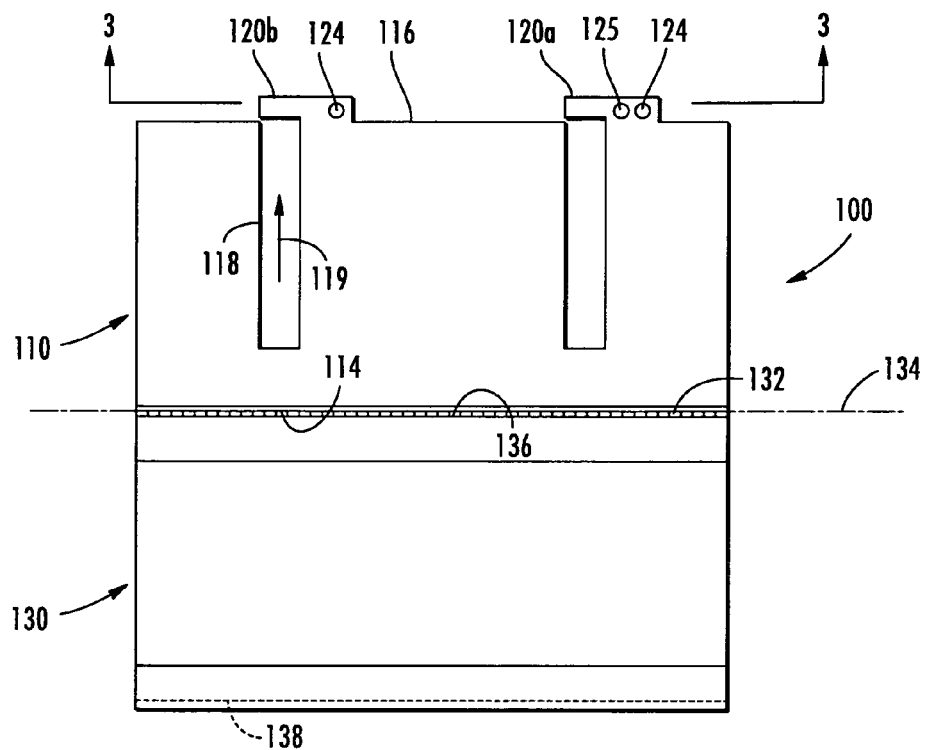
FIG. 2 is a rear view of the example terminal shield of FIG. 1.
Figure 3:
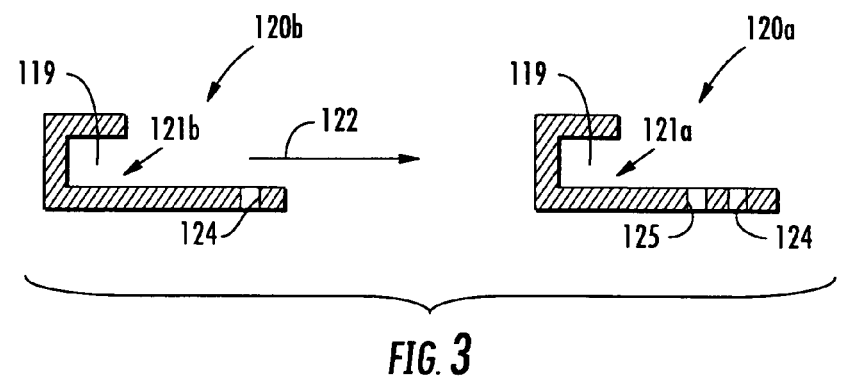
FIG. 3 is a sectional view of portions of the terminal shield along line 3-3 of FIG. 2.
Figure 4:
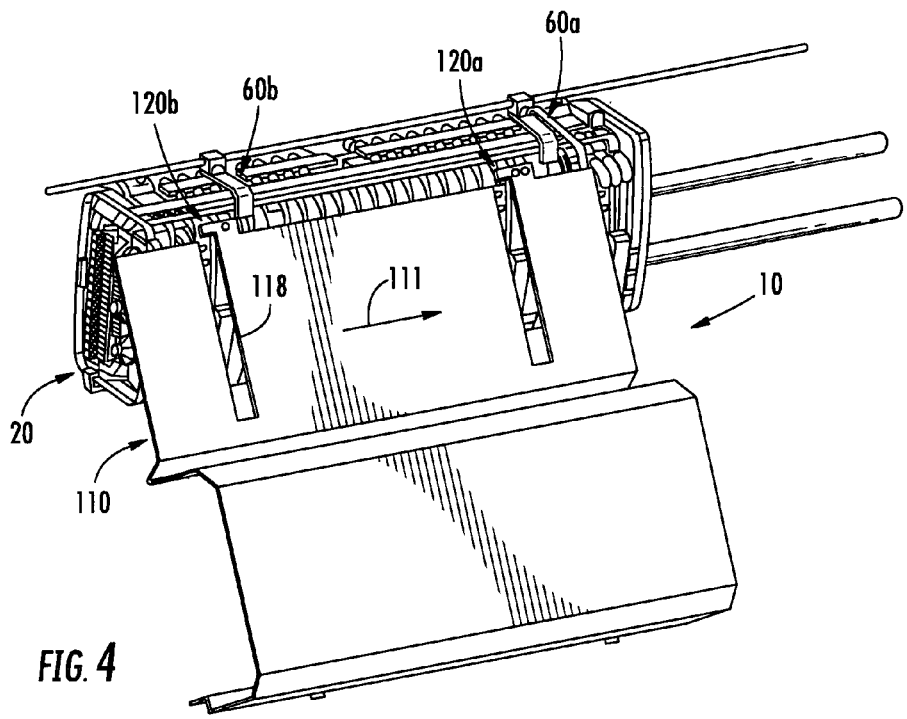
FIG. 4 is a rear perspective view of an example optical assembly of FIG. 1 with the optical terminal device in a closed orientation and the terminal shield disassembled from the optical terminal device.

The structural configuration of one example terminal shield 100 is described with respect to FIGS. 2-4. The terminal shield 100 can include a first portion 110 and a second portion 130. In one example, the first portion 110 includes an aperture 118. If provided, the aperture 118 can comprise an elongated slot although a circular or other shaped aperture may be used in further examples. The first portion 110 can also include a first edge 114 and a second edge 116 opposite the first edge. As shown, the edges 114, 116 may be substantially parallel to one another although other configurations may be employed in further examples. As further illustrated, the aperture 118 comprises an elongated vertical slot extending along a direction 119. As shown, the elongated slot may be open at the second edge 116 although the slot may be closed to the second edge in further examples.

The first portion 110 can further include various types of mounting structures configured to mount the first portion 110 with respect to the optical terminal device 20. As shown in FIGS. 2-3, the mounting structure can comprise a first hook 120a and a second hook 120b although a single or more than two hooks may be provided in further examples. One or more of the hooks, if provided, can include respective openings may be oriented to face alternative directions. For example, as shown in FIGS. 2-3, each of the hooks 120a, 120b includes a respective lateral opening 121a, 121b that both face a direction 122 that is approximately 90° to the direction 119 of each of the vertical slots. As further illustrated, the direction 122 of the hooks 120a, 120b can be parallel to the pivot axis 134 of the terminal shield 100.

The second portion 130 of the terminal shield 100 can also include a first edge 136 and a second edge 138 opposite the first edge 136. As shown, the edges 136, 138 may be substantially parallel to one another although other configurations may be employed in further examples. As shown, the first edge 114 of the first portion 110 is hingedly connected to the first edge 136 of the second portion 130 by way of a hinge structure 132. The hinge structure 132 permits the second portion 130 to pivot relative to the first portion 110 about a pivot axis 134 between an open orientation and a closed orientation. The hinge structure 132 can comprise the piano hinge arrangement shown in FIG. 1, a living hinge arrangement or other structure configured to permit the second portion 130 to pivot relative to the first portion 110. The first portion 110 and the second portion 130 can comprise similar or different structural shapes. As shown, the first portion 110 and second portion 130 are configured to be disposed about a portion of the optical terminal device 20 when the second portion 130 is pivoted relative to the first portion 110 to a closed orientation.

Figure 8:
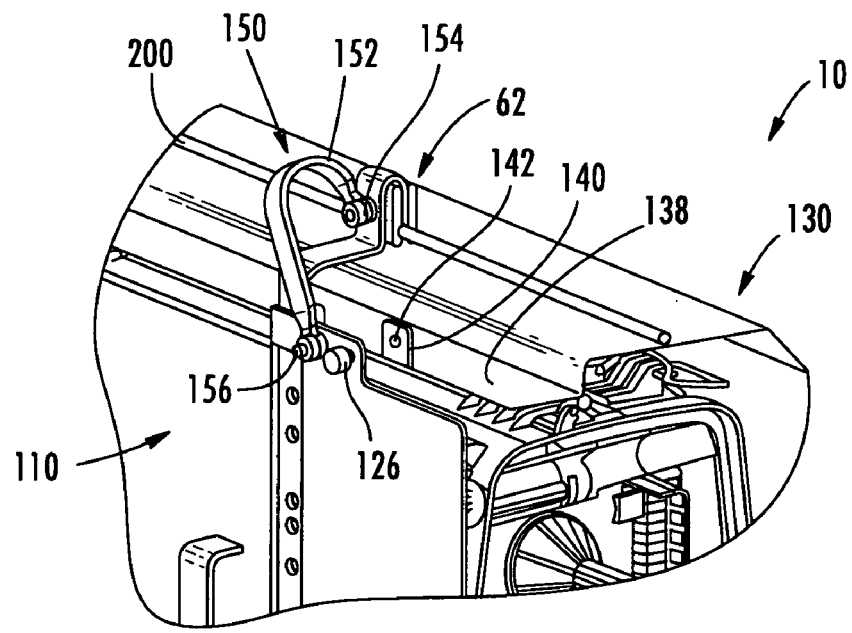
FIG. 8 is detailed view of the optical assembly illustrated in FIG. 7 showing the terminal shield before being secured with fasteners.

The terminal shield 100 can further include a retaining device configured to selectively retain the second edge 116 of the first portion 110 with respect to the second edge 138 of the second portion 130 in the closed orientation. The retaining device can comprise a biasing member, such as a spring configured to urge the first and second portions of the terminal shield 100 in the closed orientation. In further examples, as shown in FIGS. 2 and 8, the restraining device can comprise an aperture 124 in the second edge 116 of the first portion 110 configured to be aligned with an aperture 142 in a mounting tab 140 in the second edge 138 of the second portion 130. As shown in FIG. 8, a fastener 126 can extend through the aperture 124 of the first portion 110 and the aperture 142 of the second portion 130 to retain the second edge 116 of the first portion 110 with respect to the second edge 138 of the second portion 130. Similar apertures 124 can be provided with each of the hooks 120a, 120b to provide a retaining device with a plurality of fastening locations. A wide range of fasteners may be used in accordance with the present invention including quarter turn screws, thumb screws, clamps, clasps, snap connections, or other fastening arrangements. A thumb screw can provide for fastening without the use of any tools.

The terminal shield 100 can further include a grounding structure 150 configured to provide electrical communication between the terminal shield 100 and the support structure 200. The grounding structure provides an electrical circuit grounding of the terminal shield 100. In one example, the grounding structure 150 can comprise a conductive band 152 including a first end attached to the cable clamp 62 with a first conductive fastener 154. A second end of the conductive band 152 can be attached to another aperture 125 of the first portion 110 by a second conductive fastener 156. Once electrically grounded, the grounding structure 150 provides an effective path for electricity to travel from the terminal shield 100 to the support structure 200.

The first portion 110 of the terminal shield can also include an interlocking structure configured to secure the first portion 110 with respect to the optical terminal device 20. The interlocking structure can comprise a wide range of configurations that permit the first portion 110 to be interlocked with the optical terminal device 20. In one example, the interlocking structure can comprise one or more hooks such as the hooks 120a, 120b describe above. In further examples, the interlocking structure can comprise an aperture 118 such at the elongated vertical slot discussed above. As shown in FIG. 2, each hook 120a, 120b can extend over a corresponding end of each of the respective apertures 118 although the hooks may be located in other orientations in further examples. In still further examples, the interlocking structure can comprise a combination of one or more hooks with one or more apertures. For example, as shown, the interlocking structure comprises the combination of the illustrated hooks 120a, 120b and the elongated vertical slots.

Figure 5:
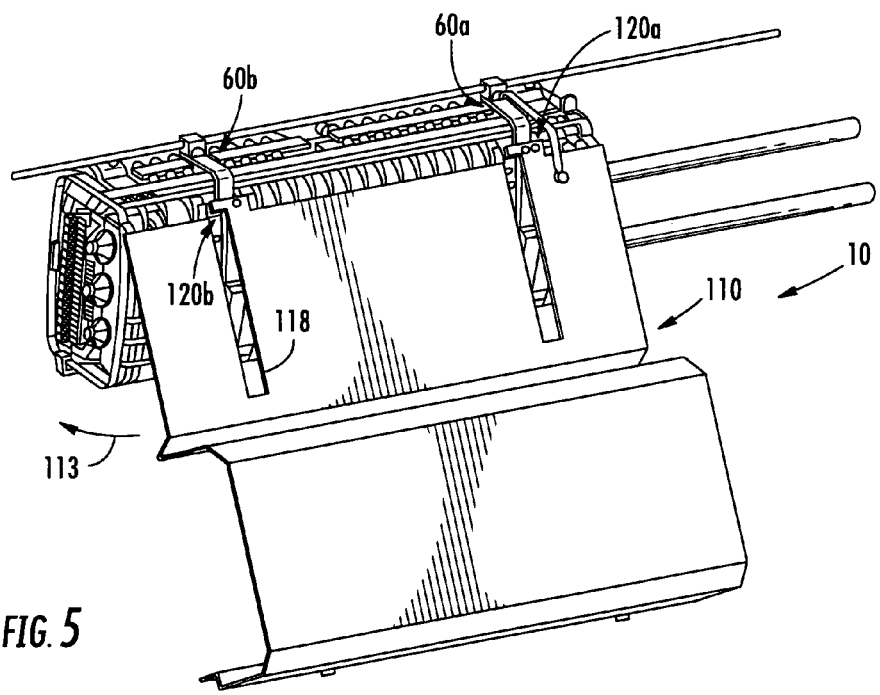
FIG. 5 is a rear perspective view of the optical assembly of FIG. 4 with hooks of the terminal shield laterally receiving portions of respective terminal brackets.

The interlocking structure allows for a field technician to easily attach the terminal shield 100 to the optical terminal device 20 without removing the optical terminal device 20 from the support structure 200. An example procedure of interlocking the first portion 110 of the terminal shield 100 to the optical terminal device 20 to assemble the optical assembly 10 is shown in FIGS. 4-6. As shown in FIG. 4, the first portion 110 is positioned relative to the optical terminal device 20 such that the hooks 120a, 120b are positioned to the left of the respective terminal brackets 60a, 60b as shown in FIG. 4. Next, the first portion 110 can be shifted to the right along direction 111 such that the openings 121a, 121b laterally receive respective portions of the terminal brackets 60a, 60b. As shown in FIG. 5, once sufficiently moved to the right along direction 111, the portions of the terminal brackets 60a, 60b are fully seated in the respective hooks 120a, 120b. In the fully seated position, the stop members 56 are aligned with the corresponding apertures 118. In examples where the stop member 56 comprises a hook, the apertures can comprise vertical slots, as shown, to receive the vertical hooks therethrough. Once aligned, as shown in FIG. 5, the first portion 110 of the terminal shield 100 can be pivoted about direction 113 such that the stop members 56 extend through the corresponding apertures 118. As shown in FIG. 6, the first portion 110 is interlocked with respect to the optical terminal device 20 with the first portion 110 extending substantially parallel to a rear wall of the base 30 of the optical terminal device 20. It will be appreciated that engagement between the hooks 120a, 120b and the corresponding portions of the terminal brackets 60a, 60b and the interaction between the stop members 56 and vertical shoulders of the apertures 118 will prevent significant lateral relative movement between the optical terminal device 20 and the terminal shield 100. Moreover, the stop members 56 may be designed to travel a limited extent within the elongated slots along direction 119. However, the bottom of the aperture 118 will limit the extent that the first portion 110 can travel vertically with respect to the optical terminal device 20. Likewise, interaction between the hooks 120a, 120b will limit the extent to which the first portion 110 can travel downward with respect to the optical terminal device 20. Accordingly, in this manner, interlocking is achieved between the first portion 110 and the optical terminal device.

To disengage the terminal shield 100 from the optical terminal device 20, the process is simply reversed. Indeed, the first portion can be pivoted in a direction opposite to direction 113 until the stop members 56 are pulled out of the apertures 118 as shown in FIG. 5. Then the terminal shield 100 can be shifted to the left as shown in FIG. 5 until the hooks 120a, 120b are laterally disengaged from the terminal brackets 60a, 60b.

Turning back to the interlocked orientation shown in FIG. 6, it will be appreciated that a field technician may allow the terminal shield 100 to be suspended from the optical terminal device 20 as shown in FIG. 6. The field technician can then service the optical terminal device 20 as shown in FIG. 1.

Figure 7:
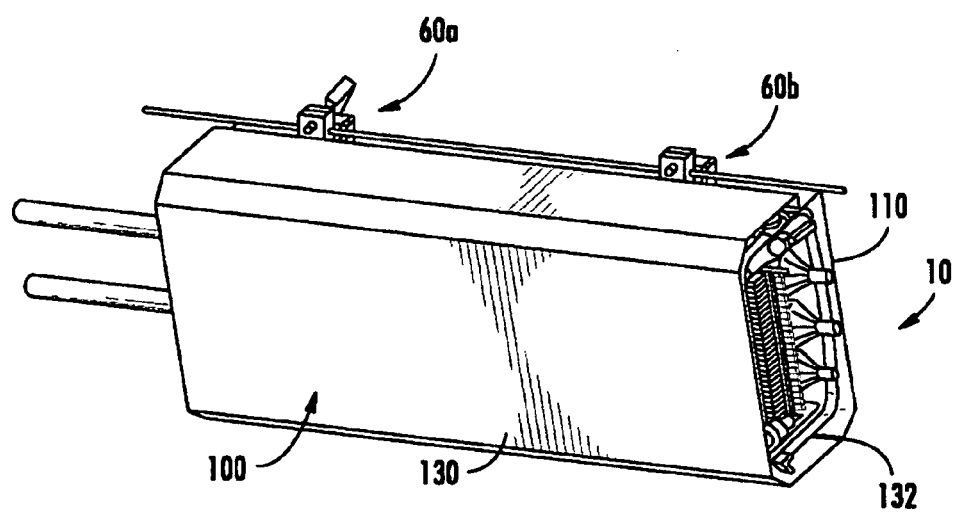
FIG. 7 is a front perspective view of the optical assembly of FIG. 6 with the terminal shield in a closed orientation.
Figure 9:
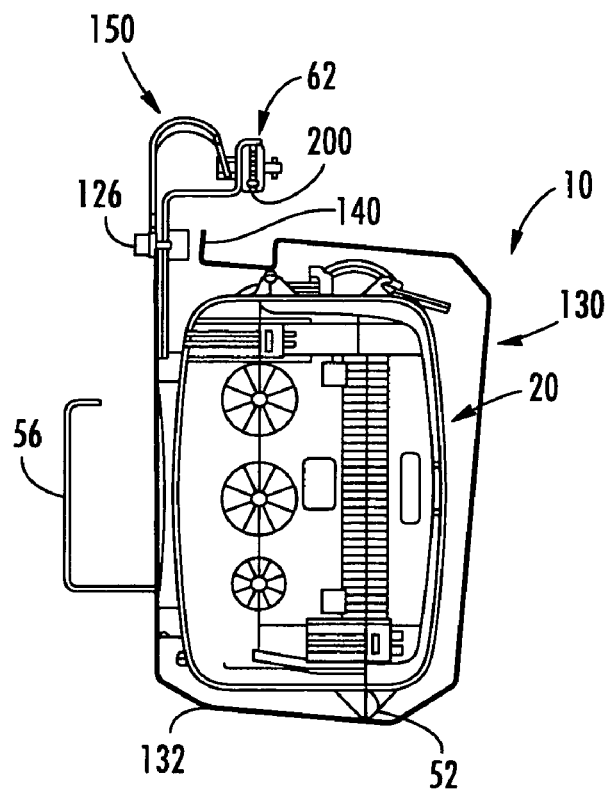
FIG. 9 is a left side view of the optical assembly illustrated in FIG. 7.

When the field technician is finished servicing optical components within the interior area 32, the optical assembly may be oriented in the closed position. To close the optical assembly, the cover 50 is pivoted about pivot axis 54 to close the optical terminal device 20. Once closed, the interior area 32 is sealed from contamination by debris and other fluids. As shown in FIG. 6, then first portion 110 may be shifted slightly upward in direction 119 and the second portion 130 can be pivoted along direction 135 about pivot axis 134 to orient the terminal shield 100 in the closed orientation shown in FIG. 7. As shown in FIGS. 8-9, the fasteners 126 can then be used to retain the terminal shield 100 in the closed orientation.

It will be appreciated that the second portion 130 can be configured to be pivotally attached relative to the first portion 110 between an open orientation and a closed orientation with the terminal shield 100 disposed about a portion of the optical terminal device 20. Once the second portion 130 is pivoted to the closed orientation, the terminal shield 100 shields the optical terminal device 20 and prevents the optical terminal device 20 from being damaged by animals or other environmental conditions. On the other hand, the second portion 130 can also be pivoted to the open orientation, wherein a field technician may access and open the cover 50 to service components located in the interior area 32 of the optical terminal device 20.

The optical assembly 10 can be provided in a variety of ways. For example, the terminal shield 100 and the optical terminal device 20 can be sold together as a kit for subsequent assembly into an optical assembly 10. In further examples, the optical assembly 10 can be preassembled and sold as an assembled unit. In further examples, the terminal shield 100 can be sold separately to permit retrofitting of existing optical terminal devices 20 with a terminal shield 100. The terminal shield 100 can be designed to a unique type of optical terminal device 20. In further examples, the terminal shield can comprise a universal terminal shield 100 configured to be used with different types of optical terminal devices 20. It will therefore be appreciated that a terminal shield 100 may be purchased separately and then used to retrofit an existing optical terminal device 20 to provide the optical assembly 10. In further examples, a universal terminal shield 100 may be provided to permit retrofitting of a wide variety of different types of optical terminal devices 20. Moreover, the design of the terminal shield 100 can permit installation of the terminal shield to an existing optical terminal device 20 without dismounting the optical terminal device from the support structure 200.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical assembly for interconnections between optical fibers comprising:
    an optical terminal device;
    a terminal bracket for connecting to the optical terminal device; and
    a terminal shield including a first portion hingedly attached to a second portion,
    wherein the first portion is configured to be removably attached with respect to the optical terminal device and the second portion is configured to be pivoted relative to the first portion between an open orientation providing access to an area of the optical terminal device and a closed orientation with the terminal shield disposed about a portion of the optical terminal device; and
    wherein the first portion includes a hook configured to receive a portion of the terminal bracket to removably attach the terminal shield to the optical terminal device.

2. The optical assembly of claim 1, further including a grounding structure providing electrical communication between the terminal shield and the terminal bracket.

3. The optical assembly of claim 1, wherein the hook includes a lateral opening configured to laterally receive the portion of the terminal bracket.

4. The optical assembly of claim 1, wherein the terminal bracket is a hanging bracket.

5. An optical assembly for interconnections between optical fibers comprising:
    an optical terminal device;
    a terminal bracket for connecting to the optical terminal device; and
    a terminal shield including a first portion hingedly attached to a second portion,
    wherein the first portion is configured to be removably attached with respect to the optical terminal device and the second portion is configured to be pivoted relative to the first portion between an open orientation providing access to an area of the optical terminal device and a closed orientation with the terminal shield disposed about a portion of the optical terminal device;
    wherein the first portion includes an interlocking structure configured to selectively interlock the first portion with respect to the optical terminal device, and
    wherein the interlocking structure includes a hook and an aperture configured to removably attach the terminal shield to the optical terminal device, and the optical assembly includes a stop member configured to protrude through the aperture to facilitate interlocking of the first portion with respect to the optical terminal device.

6. The optical assembly of claim 5, wherein the stop member is configured to limit lateral movement between the optical terminal device and the terminal shield.

7. The optical assembly of claim 5, wherein the aperture includes a slot and the stop member is configured to vertically travel within the slot to permit a vertical movement of the terminal shield with respect to the optical terminal device.

8. The optical assembly of claim 5, wherein the stop member comprises a cable support configured to support a length of cable.

9. The optical assembly of claim 5, further including a retaking device configured to selectively retain the terminal shield in the closed orientation.

10. The optical assembly of claim 5, wherein the first portion and the second portion each include a first edge and a second edge opposite the first edge, wherein the first edges are hingedly attached together and the second edges are configured to be selectively retained with respect to one another in the closed orientation.

11. The optical assembly of claim 5, wherein the terminal bracket is a hanging bracket.

12. The optical assembly of claim 5, further including a grounding structure providing electrical communication between the terminal shield and the terminal bracket.

13. The optical assembly of claim 1, further including a retaining device configured to selectively retain the terminal shield in the closed orientation.

14. The optical assembly of claim 1, wherein the first portion and the second portion each include a first edge and a second edge opposite the first edge, wherein the first edges are hingedly attached together and the second edges are configured to be selectively retained with respect to one another in the closed orientation.

15. A terminal shield configured to protect an optical terminal device for interconnections between optical fibers, the terminal shield comprising:
   a first portion including an interlocking structure configured to secure the first portion with respect to the optical terminal device;
   a second portion pivotally attached to the first portion, wherein the second portion includes a retaining device configured to selectively retain the terminal shield in a closed orientation; and
   a grounding structure configured to provide electrical communication between the terminal shield and a support structure.

16. A terminal shield configured to protect an optical terminal device for interconnections between optical fibers, the terminal shield comprising:
   a first portion including an interlocking structure configured to secure the first portion with respect to the optical terminal device; and
   a second portion pivotally attached to the first portion, wherein the second portion includes a retaining device configured to selectively retain the terminal shield in a closed orientation; and a closed orientation with the terminal shield disposed about a portion of the optical terminal device;
   wherein the interlocking structure includes a hook with a lateral opening configured to removable attach the terminal shield to the optical terminal device and an aperture configured to receive a stop member of the optical terminal device.

17. The terminal shield of claim 16, further including a grounding structure configured to provide electrical communication between the terminal shield and a support structure.

18. The terminal shield of claim 16, wherein the aperture comprises a vertical slot.

19. The terminal shield of claim 18, wherein the lateral opening of the hook faces a direction that is approximately 90° to a direction of the vertical slot.

20. A terminal shield configured to protect an optical terminal device for interconnections between optical fibers, the terminal shield comprising:
   a first portion configured to be secured with respect to the optical terminal device;
   a second portion pivotally attached to the first portion, wherein the second portion is configured to be pivoted relative to the first portion between an open orientation to provide access to an area of the optical terminal device and a closed orientation with the terminal shield disposed about a portion of the optical terminal device; and
   a grounding structure configured to provide electrical communication between the terminal shield and a terminal bracket.

21. A terminal shield configured to protect an optical terminal device for interconnections between optical fibers, the terminal shield comprising:
   a first portion configured to be secured with respect to the optical terminal device; and
   a second portion pivotally attached to the first portion, wherein the second portion is configured to be pivoted relative to the first portion between an open orientation to provide access to an area of the optical terminal device and a closed orientation with the terminal shield disposed about a portion of the optical terminal device;
   wherein the first portion includes an interlocking structure configured to selectively interlock the first portion with respect to the optical terminal device, and
   wherein the interlocking structure includes a hook with a lateral opening configured to removably attach the terminal shield to the optical terminal and an aperture configured to receive a stop member of the optical terminal device.

22. The terminal shield of claim 21, wherein the first portion and the second portion each include a first edge and a second edge opposite the first edge, wherein the first edges are hingedly attached together and the second edges are configured to be selectively retained with respect to one another in the closed orientation.

23. The terminal shield of claim 21, further including a grounding structure configured to provide electrical communication between the terminal shield and a terminal bracket.

24. The terminal shield of claim 21, wherein the aperture comprises a vertical slot.

25. The terminal shield of claim 24, wherein the lateral opening of the hook faces a direction that is approximately 90° to a direction of the vertical slot.

26. The terminal shield of claim 21, further including a retaining device configured to selectively retain the terminal shield in the closed orientation.

27. A terminal shield configured to protect an optical terminal device for interconnections between optical fibers, the terminal shield comprising:
   a first portion and a second portion that each include a first edge that are hingedly connected together, the first and second portions each include a second edge opposite the respective first edge, the second edge of the first portion including a hook configured to removably attach the terminal shield to the optical terminal device and the first portion further including an aperture configured to receive a stop member of the optical terminal device; and
   a retaining device configured to selectively retain the second edges with respect to one another in a closed orientation.

28. The terminal shield of claim 27, wherein the hook includes a lateral opening and the aperture of the first portion comprises a vertical slot, wherein the lateral opening of the hook faces a direction that is approximately 90° to a direction of the vertical slot.

29. The terminal shield of claim 27, further including a grounding structure configured to provide electrical communication between the terminal shield and a support structure.

* * * * *

UNITED STATES PATENT AND TRADEMARK OFFICE
CERTIFICATE OF CORRECTION

PATENT NO. : 7,660,508 B2
APPLICATION NO. : 12/082330
DATED : February 9, 2010
INVENTOR(S) : Marcel Gabriel Mures et al.

It is certified that error appears in the above-identified patent and that said Letters Patent is hereby corrected as shown below:

| Col. | Line | Description |
|---|---|---|
| 8 | 48 | retaining device configured to selectively retain the terminal |
| 9 | 26-28 | closed orientation**.** *Omit:* ~~and a closed orientation with the terminal shield disposed about a portion of the optical terminal device;~~ |
| 9 | 30 | lateral opening configured to removably attach the ter- |

Signed and Sealed this
Sixth Day of December, 2011

David J. Kappos
*Director of the United States Patent and Trademark Office*